H. W. AITKEN.
PRESSURE REGULATING DEVICE FOR THE ROLLERS OF SUGAR CANE MILLS.
APPLICATION FILED OCT. 10, 1914.

1,210,254.

Patented Dec. 26, 1916.
3 SHEETS—SHEET 1.

Witnesses:
P. F. Nagle.
H. G. Dieterich.

Inventor:
Hugh Wallace Aitken,
By Wiedersheim & Fairbanks.
Attorneys.

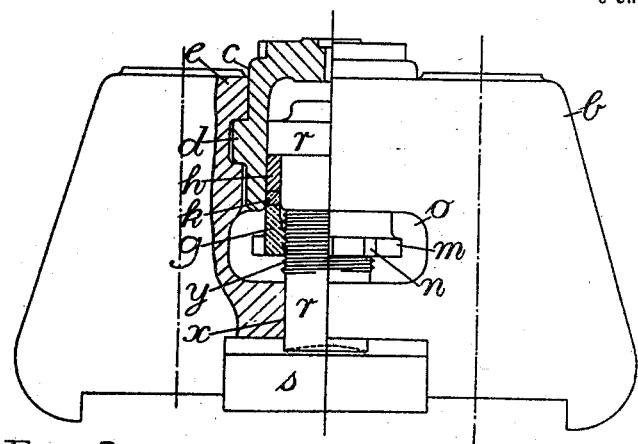
Fig: 5.
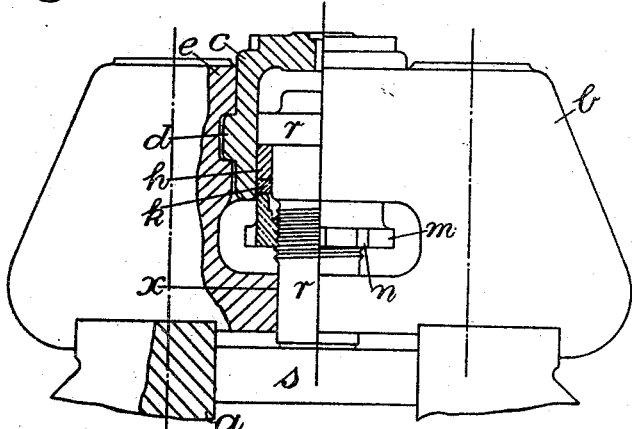
Fig: 6.
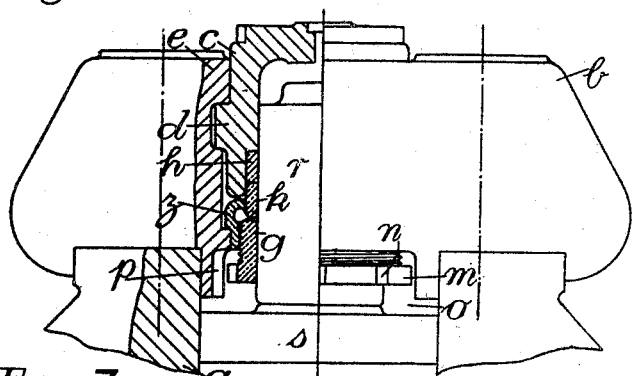
Fig: 7.

UNITED STATES PATENT OFFICE.

HUGH WALLACE AITKEN, OF GLASGOW, SCOTLAND.

PRESSURE-REGULATING DEVICE FOR THE ROLLERS OF SUGAR-CANE MILLS.

1,210,254.  Specification of Letters Patent.  Patented Dec. 26, 1916.

Application filed October 10, 1914. Serial No. 866,092.

*To all whom it may concern:*

Be it known that I, HUGH WALLACE AITKEN, a subject of the King of Great Britain and Ireland, residing at Richmond Chambers, 147 Bath street, Glasgow, Scotland, have invented certain new and useful Improvements in Pressure-Regulating Devices for the Rollers of Sugar-Cane Mills; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to pressure-regulating devices for the rollers of sugar cane mills.

It is common practice to employ hydraulic cylinders for controlling the pressure on the bearings of the top roller or one or both of the side rollers of sugar cane mills, these cylinders being placed within the headstock caps which hold in the bearings of the hydraulically-controlled roller. It is usual to employ U or cup leathers for packing the rams of these hydraulic cylinders; and much objectionable delay is frequently caused by these leathers giving way and requiring the stopping of the mill for several hours while the necessary operations are performed to allow a new leather to be inserted.

According to the present invention—which will be described in the following specification and more particularly defined in the annexed claims—I so arrange the hydraulic cylinder, ram and packing as to prevent, or greatly reduce, the objectionable delays above mentioned, and at the same time provide a convenient and advantageous construction and arrangement of cylinder and ram. I prefer to employ compressible packing retained and compressed by a screwed-in (or otherwise adjustable) gland; and I provide for the adjustment of the gland (to tighten the packing) without withdrawing the cylinder or its cover, or the ram, or moving the headstock cap.

The carrying of my invention into effect is illustrated by the accompanying drawings.

Figure 1 and each of the Figs. 3–11 is a vertical section through the top headstock cap and hydraulic cylinder of a sugar cane mill, these several figures showing different forms which may be employed. Fig. 2 is, as regards its left-hand portion, a section on the line A B of Fig. 1 and, as regards its right-hand portion, a section on the line C D of the same figure.

Referring in the first place to Figs. 1 and 2, $a$ is the headstock of the mill, $b$ the headstock cap, $c$ the hydraulic cylinder, $r$ the ram, and $j$ the top roller bearing. The cylinder is adapted to be inserted in the cap from the top or outside end of the latter and to be secured in the cap in a convenient manner adequate to withstand the thrust exerted on it when in action. For example, the "bayonet joint" attachment already well known may be employed, *i. e.*, the cylinder may be provided with two or more lugs $d$, and the hole in the cap furnished with a corresponding number of inward projections $e$. The cylinder, after being introduced by an axial movement into the hole in the cap, is given a fractional turn so as to bring the lugs $d$ under the projections $e$. The lower end of the cylinder is internally threaded at $f$ to receive a gland $g$ which is externally threaded and screwed into the cylinder so as to compress packing $h$ within a stuffing box provided in the cylinder. $k$ is a metal ring provided between the end of the gland and the packing so that the rotation of the gland in screwing up does not tend to rotate the packing. The lower end of the gland is formed with an external flange $m$ provided with grooves $n$, which construction enables the gland to be gripped and rotated by a wrench or spanner. A hole $o$ is formed right through the headstock cap from side to side (*i. e.*, parallel to the axis of the roller) and the cap is further cut away at $p$ so as to allow room for manipulating the gland without moving the headstock cap or cylinder. $w$ is the pressure fluid connection to the hydraulic cylinder. $s$ is a bolster piece placed between the bearing $j$ and the ram $r$. This bolster piece is adapted to slide between, and be guided by, the jaws $t, t$ of the cap.

Fig. 3 shows a construction and arrangement of pressure-regulating device in general the same as that illustrated in Figs. 1 and 2, but with a slightly different design of headstock cap.

In the arrangement shown in Fig. 4 the cap is closed-in below the hole $o$ so as to form a guide at $x$ for the bottom of the ram.

Fig. 5 shows an arrangement generally the same as that shown in Fig. 4, except that the gland is screwed to the ram instead of the cylinder, the ram being threaded at *y* to engage with an internal thread on the gland.

Fig. 6 shows an arrangement generally the same as that shown in Fig. 5, except that the bolster piece slides between the two sides of the headstock *a* instead of between the jaws of the cap.

In the arrangement shown in Fig. 7, the gland is screwed to a nipple *z* which is inserted in the cap below the hydraulic cylinder.

Fig. 8 shows an arrangement with a U leather 2 in addition to compressible packing *h*. The gland is screwed to the ram, the packing *h* located in a recess in the ram, and the U leather located in an independent recess in the ram. The packing *h* can be compressed without exerting pressure on the U leather. With this arrangement the U leather may be normally relied on to prevent leakage; but, when the leather fails, the gland *g* may be screwed up so as to compress the packing *h*, and dependence placed wholly on the packing *h* to prevent leakage. The leather can be renewed at any convenient time by withdrawing the hydraulic cylinder, removing the ram therefrom and unfastening from the latter the removable top or cover piece 3 which holds in the leather.

In the constructions hereinbefore described, the cylinder has been formed separately from the cap and inserted into the cap in an axial direction from the top or outside of the cap. The cylinder may, however, be formed integrally with the cap, that is, a recess may be bored out of the cap to form the cylinder. A liner may, or may not, be provided in this recess.

Figure 9:
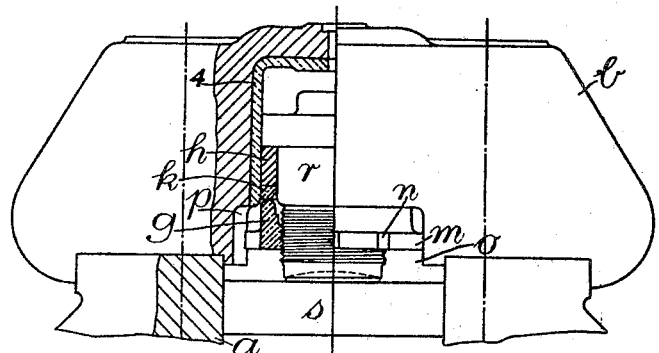

Fig. 9 shows an arrangement in which the cylinder is bored out of the cap, and a liner 4 provided. The cylinder and liner are shown with closed upper or outer ends, the ram being inserted within the cylinder before the cap is placed on the headstock.

Figure 10:
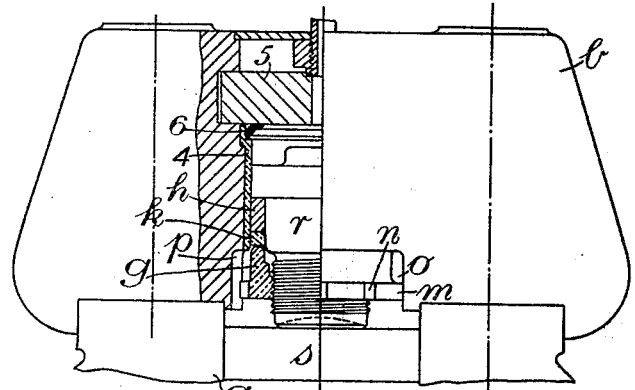

Fig. 10 shows an arrangement in which the cylinder is bored out of the cap, but the upper or outer end of the cylinder is closed and kept tight by means of a gate or cover 5 and a cup leather 6. The gland might be screwed to the headstock cap instead of to the ram.

Figure 11:
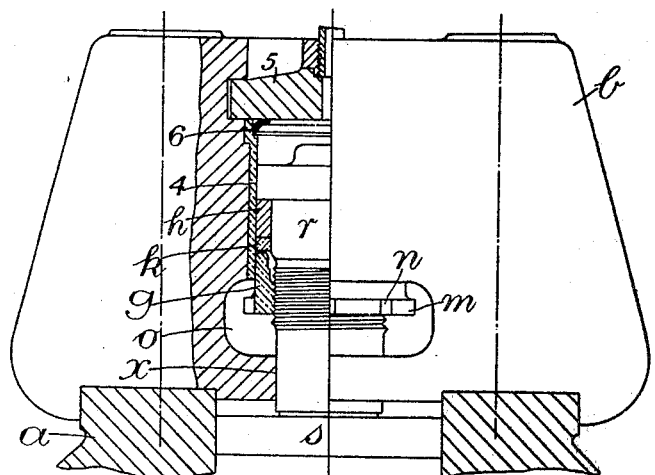

Fig. 11 shows an arrangement generally the same as that shown in Fig. 10, except that the cap is closed in below the opening *o* to act as a guide for the ram.

Figure 3:
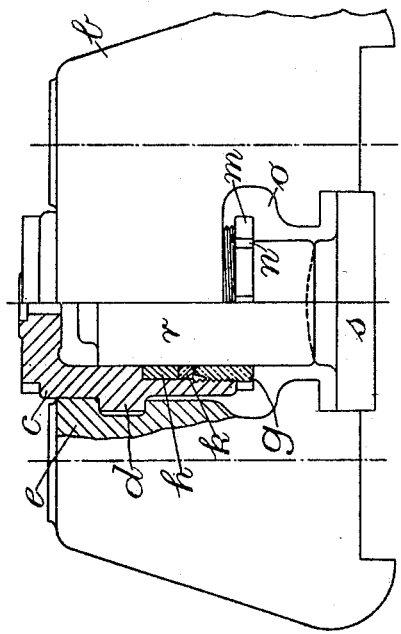
Figure 4:
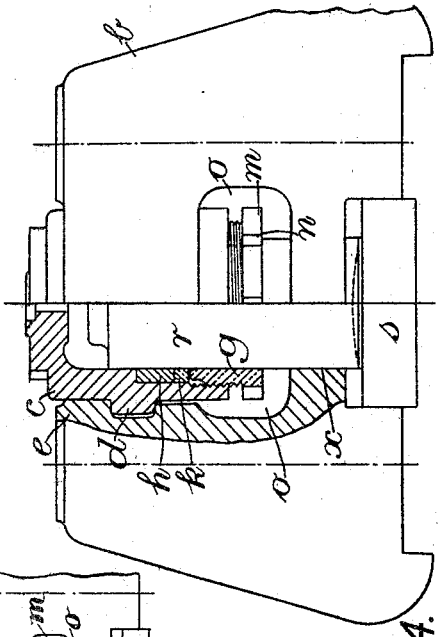
Figure 1:
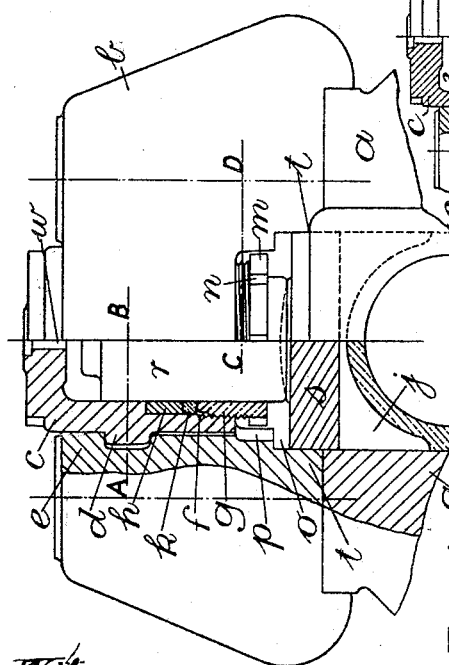
Figure 2:
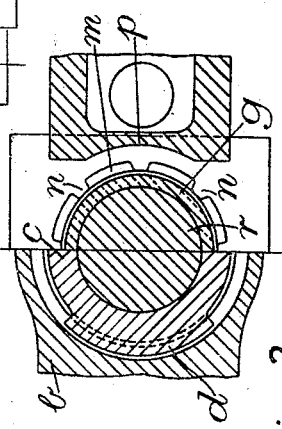

The gate or cover 5 shown in Figs. 10 and 11 may either be slid into place in a direction perpendicular to the axis of the cylinder, or a "bayonet joint" device employed of the same general nature as that illustrated in Figs. 1 and 2 of the present specification for securing the cylinder within the cap.

All the figures illustrate the application of my invention to the top roller bearings of a sugar cane mill, but the invention is equally applicable to the bearings of one or both of the side rollers and, moreover, without any substantial alterations in construction.

It will be seen that in all the foregoing embodiments of my invention, provision is made for the removal or adjustment of the packing without withdrawing or dismantling the cylinder or ram or removing the headstock cap, since the operative portion of the gland *m*, which is the portion to which the spanner or other suitable implement is adapted to be applied, is in every instance at all times located in proximity to the opening *o* so as to be easily accessible and readily manipulated whenever desired.

So far as I am aware, I am the first in the art to employ a construction of this character in a sugar cane mill and my claims to these features are therefore to be interpreted according to the scope given to inventions of this character.

In the hereinbefore description the gland has been described and illustrated as screw-threaded and, except in one case (Fig. 7), directly secured by said screw-thread to the cylinder or ram. This construction has the advantage that the gland takes up the minimum of space; but the gland could be otherwise secured to the cylinder or ram, say, for example, by studs and nuts, or bolts and nuts, in the well known manner commonly employed for the glands of stuffing boxes and the like.

Having thus described my invention, what I claim as new and desire to secure by Letters Patent is:—

1. In a sugar cane mill, a headstock cap having an opening through its side wall, a ram packing within the headstock cap, and a gland to adjust the ram packing and accessible through said opening for adjustment.

2. In a sugar cane mill, a headstock cap, a ram packing within said headstock cap, and a gland for said ram packing, said headstock cap having a lateral cut away portion for rendering said gland accessible for adjustment.

In testimony whereof I have signed my name to this specification in the presence of two subscribing witnesses.

HUGH WALLACE AITKEN.

Witnesses:
 JOHN GEORGE STEVENSON,
 GEORGE TAYLOR.